Nov. 15, 1949  J. W. COLTMAN  2,488,378
APPARATUS FOR MEASURING HIGH-FREQUENCY ENERGY
Filed Aug. 25, 1944

WITNESSES:
*Leon M. Garman*
*John L. Shipman*

INVENTOR
John W. Coltman.
BY *F. W. Lyle*
ATTORNEY

Patented Nov. 15, 1949

2,488,378

UNITED STATES PATENT OFFICE 2,488,378

APPARATUS FOR MEASURING HIGH-FREQUENCY ENERGY

John W. Coltman, Wilkinsburg, Pa., assignor to Westinghouse Electric Corporation, East Pittsburgh, Pa., a corporation of Pennsylvania Application August 25, 1944, Serial No. 551,144

7 Claims. (Cl. 171—95)

This invention relates to measuring apparatus for use in exploring high-frequency electromagnetic fields.

One arrangement which is widely used in exploring high-frequency fields includes a probing rod or wire, one end of which is adapted to be inserted in the field. High-frequency energy is then fed from the probing rod into a crystal detector. The crystal detector has rectifying properties and the direct current flowing therethrough varies substantially in accordance with variations in the energy extracted from the high frequency field. The rectified current is then measured by a suitable indicating device such as a galvanometer.

In another commonly used arrangement, the crystal detector is replaced by a bolometer element which is also connected in a direct current circuit through a galvanometer or other indicating device. The high-frequency current flowing through the bolometer element changes the resistance thereof in accordance with variations in the high-frequency energy, and this variation in resistance produces a similar variation in the current flowing through the direct current circuit.

In both of these prior arrangements, a quarter-wave length tuning stub is associated with the coaxial conductor which leads from the probe to the crystal or bolometer as the case may be. This tuning stub is a resonant circuit and forms a return path for the direct current while avoiding a short circuit for the high-frequency current. However, because the tuning stub is a resonant circuit, it is effective only over a rather narrow range of wave lengths so that the measuring apparatus is quite critical with respect to the wave length of the electromagnetic field being explored and must be rather carefully tuned. In most applications this is a highly undesirable feature. Not only does it add to the difficulty of making a measurement, but if more than one frequency is present, erroneous results may be obtained.

It is accordingly an object of my invention to provide a novel measuring apparatus for use in exploring a high-frequency electromagnetic field, the response of which is substantially independent of the wave length of the field over a range of wave lengths very much greater than in similar prior apparatus.

A more general object of my invention is to provide a new and improved measuring apparatus for exploring high-frequency electromagnetic fields.

A further object of my invention is to provide new and improved measuring apparatus employing a probe for exploring a high-frequency electromagnetic field which apparatus is simple and inexpensive in construction.

Further objects of my invention, as well as the advantages and improvements offered thereby over the prior art, may be best understood from the following descriptions of a prior art structure and specific structures embodying my invention when read in connection with the accompanying drawings, in which.

Figure 1:
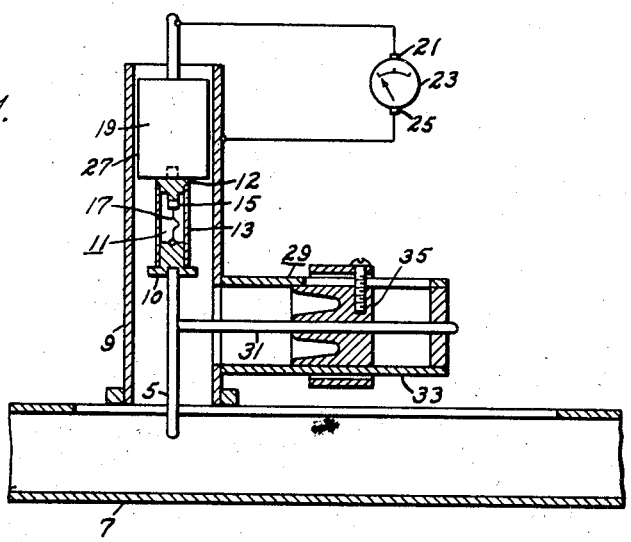
Figure 1 illustrates a typical prior art arrangement.

To fully explain the nature of the problem involved and the solution thereto as afforded by my invention, it is believed to be desirable to illustrate and describe a typical prior art measuring apparatus. Such apparatus is shown in Fig. 1 and includes a probing rod 5 having a free end which is adapted to be inserted in an electromagnetic field which may be contained within a hollow conductor, such as a wave guide 7. The remainder of the probing rod 5 forms the center conductor of a coaxial line having an outer conductor 9 connected to the guide 7. The center conductor is connected to one end piece 10 of a crystal detector 11 which has rectifying properties and is arranged to offer its lower resistance to a flow of current from the probing rod through the detector. The detector 11 includes two end pieces 10 and 12 supported by a hollow ceramic cylinder 13. A crystal 15 of suitable material, such as silicon, is secured to the end piece 12 within cylinder 13 and is engaged by the free end of a fine wire 17 or "cats whisker" connected to end piece 10. The other end piece 12 of the detector 11 is connected through a metallic member 19 to one terminal 21 of a suitable indicating meter, such as a galvanometer 23. The other terminal 25 of the galvanometer is connected to the outer conductor 9 of the coaxial line.

The metallic member 19 is shaped so that its surface 27 cooperates with the inner surface of conductor 9 to form a high-frequency current bypassing capacitor connected between the detector 11 and the outer conductor 9. If desired, insulating material may be placed between the surface 27 of member 19 and the outer conductor 9 in forming the capacitor. Thus, a high-frequency circuit is provided from the probing rod 5 through the detector 11 and the bypassing capacitor to the wall of the wave guide 7, the high-frequency voltage being impressed between the probing rod and that wall.

Direct current tends to flow from probing rod 5 through the detector 11 and the galvanometer 23 to the outer conductor 9 of the coaxial line. However, it is necessary to complete the direct current circuit from the outer conductor 9 to the probing rod or center conductor of the coaxial line. The direct current circuit is completed by providing a quarter-wave length tuning stub 29. This tuning stub 29 comprises another section of a coaxial line, the center conductor 31 and outer conductor 33 of which are connected to the center and outer conductors 5 and 9 respectively of the first coaxial line. A shorting plunger 35 extends across the interior of the second coaxial line and provides a direct connection from the outer conductor 33 to the center conductor 31 through which the direct current may flow. To prevent the high-frequency current from being short-circuited by the plunger 35, the latter is made adjustable and is placed approximately one quarter-wave length from the center conductor 5 of the first coaxial line. In this manner the resonant circuit of the tuning stub is tuned to provide a high impedance to high-frequency current and thereby cause such current to be fed to the crystal detector 11. Since the tuning stub 29 is a resonant circuit, the apparatus shown in Fig. 1 is quite critical with respect to wave length and must be rather carefully tuned.

Figure 2:
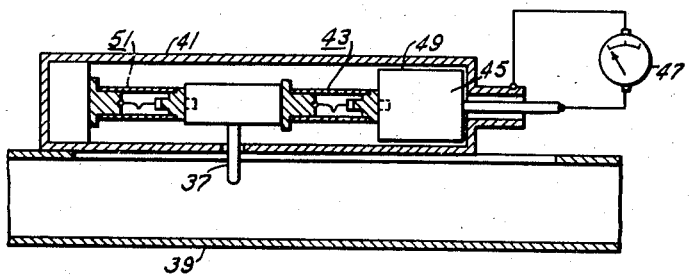
Fig. 2 shows measuring apparatus embodying my invention.

In accordance with my invention, tuning of the apparatus may be avoided as illustrated in Fig. 2. In this figure a probing rod 37 is again provided, the free end of which is adapted to be inserted in a high-frequency electromagnetic field which may be contained within a hollow conductor, such as a wave guide 39 as illustrated. The other end of the probing rod 37 extends into but is insulated from a housing 41 which is connected to or in contact with the wall of guide 39. A first crystal detector 43 of suitable structure such as that described in connection with Fig. 1, is mounted within the housing 41. Detector 43 is connected to the end of the probe 37 within housing 41 in such a manner as to offer its lower resistance to a flow of current from the probing rod through the detector. The first detector 43 is also insulated from the housing 41 but is connected thereto through a metallic member 45 and a suitable meter 47 for indicating the magnitude of direct current flowing therethrough, such as a galvanometer. The metallic member 45 is also shaped so that its surface 49 cooperates with the inner surface of housing 41 to form a high-frequency current bypassing capacitor from the first detector to the housing 41. As in Fig. 1, insulating material may be placed between member 45 and housing 41 in forming the capacitor if desired.

A second crystal detector 51 is also mounted within the housing 41 and is connected from the end of the probing rod 37 therein to the housing 41. The connection of the second detector 51 is such that it offers its higher resistance to a flow of current from the probing rod 37 through the second detector.

In the operation of the apparatus shown in Fig. 2, high-frequency current is fed from the probing rod 37 to the two crystal detectors 43 and 51. Because of the manner of connection of the crystal detectors with respect to their rectifying properties, the high-frequency current is not short-circuited through the second detector 51 to the housing 41 and the wall of guide 39 but instead is fed through the first detector 43. The current rectified by the first detector 43 passes through the metallic member 45 and the galvanometer 47 to the housing 41. From the housing 41 the direct current circuit is completed through the second detector 51 to the end of the probe 37 within the housing. Since the crystal detectors 43 and 51 are capable of causing the direct current flowing therethrough to vary substantially in accordance with variations in the high-frequency voltage produced between the probing rod and the wall of guide 39, the reading of the galvanometer 47 is an indication of the magnitude of the high-frequency energy at the place in which the probe is inserted in the field. For many applications, a slot is provided in the wave guide or other conductor so that the position of the probe may be varied to fully explore the electromagnetic field.

It is to be noted that the apparatus shown in Fig. 2 is quite simple and inexpensive in construction. Moreover, the direct current path is completed without the necessity of providing a tuning stub. Consequently, the arrangement is not limited to a narrow range of wave lengths. While an arrangement constructed as shown in Fig. 1 was found to give a good response only over a range of approximately 1% about the wave length for which it was tuned, a single apparatus constructed as shown in Fig. 2 was found experimentally to respond equally well to wave lengths of the order of 3, 9 and 12 centimeters at which equipment was available to test it.

Figure 3:
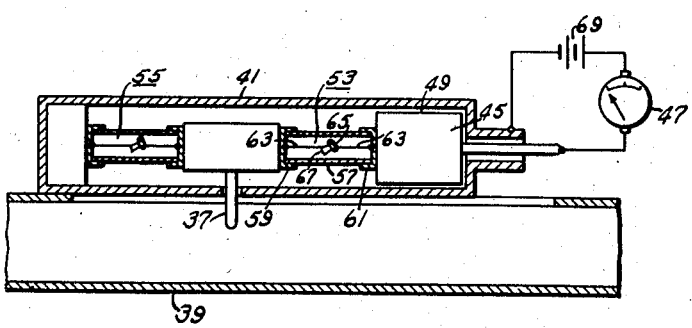
Fig. 3 illustrates a modification of the arrangement shown in Fig. 2.

In Fig. 3 is illustrated a somewhat similar arrangement embodying my invention in which bolometer elements are employed in place of crystal detectors. The general structure is similar to that of Fig. 2, and the same reference characters are applied to identical parts. However, a pair of bolometer elements 53 and 55 are substituted for the crystal detectors 43 and 51 of Fig. 2. A typical bolometer element comprises a cylinder of insulating material 57 having conductive end plates 59 and 61 with a wire 63 extending from each end plate to approximately the center of the cylinder. The two wires 63 are separated from each other by an insulating bead 65 but are connected by an extremely fine resistance wire 67.

High-frequency current flowing through a bolometer element heats up the resistance wire 67 to an extent to cause the resistance thereof to direct current to vary substantially in accordance with variations in the high-frequency energy. Since the bolometer elements do not have rectifying properties, direct current must be provided from a source other than the probing rod. This direct current is provided from a source such as a battery 69 connected in series with the galvanometer 47.

In operation a high-frequency current branches from the probe through either or both bolometer elements to the housing 41, current through the first bolometer 53 also passes through the bypassing capacitor to the housing. Direct current flows in a path extending from the battery 69 through the bolometer elements 53 and 55, housing 41 and the galvanometer 47. Since the resistance to direct current flow offered by the bolometer elements varies in accordance with variations in the high-frequency energy, the reading of the galvanometer is an indication of the magnitude of that high-frequency energy.

It is to be understood that in either of the arrangements shown in Fig. 2 or Fig. 3 a resistor offering sufficient impedance to the high-frequency current may be substituted for the second detector or the second bolometer element. This substitution would decrease the sensitivity of the arrangement by a considerable amount, but it might be useful where simplicity and compactness are desirable and sensitivity is not of prime importance. In such an arrangement the high-frequency current through the resistors would be wasted in that it would not contribute to the control of the direct current.

It is to be noted that whether crystal detectors or bolometers are used, the common problem of furnishing a direct current return path without rendering the apparatus highly sensitive to wave lengths is solved by my invention.

Although I have shown and described specific embodiments of my invention, I am aware that many modifications thereof are possible without departing from the spirit of the invention. It is not my intention therefore to limit the scope of my invention to the specific embodiments described and illustrated.

I claim as my invention:

1. Apparatus for exploring a high-frequency electromagnetic field within a hollow conductor, comprising a housing adapted to be in connection with said hollow conductor, a conductive probing rod having one end extending into but insulated from said housing with the other end being adapted to be inserted in said field, a first crystal detector mounted within said housing but insulated therefrom, said first detector having current rectifying properties and being connected to said one end of the probing rod to offer its lower resistance to current from said rod, a meter for measuring the magnitude of the direct current flowing therethrough connected from said first detector to said housing, means forming a high-frequency current bypassing capacitor from said first detector to the housing, and a second crystal detector having current rectifying properties mounted within said housing and connected from said one end of the probing rod to the housing to offer its higher resistance to current from said rod.

2. Apparatus for exploring a high-frequency electromagnetic field within a hollow conductor, comprising a housing adapted to be in connection with said conductor, a conductive probing rod having one end extending into but insulated from said housing with the other end being adapted to be inserted in said field, a first bolometer element mounted within but insulated from said housing and connected to the other end of said probing rod, means adapted to supply a direct current voltage and a meter for measuring the magnitude of direct current flowing therethrough connected in a series circuit from said first element to housing, means forming a high-frequency current bypassing capacitor from said first element to housing, and a second bolometer element connected from the other end of said probing rod to said housing, said bolometer elements being capable of varying the flow of direct current through said meter in accordance with variations in the high-frequency voltage produced between said rod and said conductor.

3. Apparatus for use with a source of high frequency voltage comprising a direct current load device, a pair of crystal detectors connected in a series circuit with each other and the load device, each of said detectors having current rectifying properties and offering its lower resistance to current in one direction in said circuit, one of said detectors being adapted to have a voltage from said source impressed thereacross, and a capacitor for by-passing high frequency current about the load device connected in parallel with the load device and with the series connected detectors.

4. Apparatus for exploring a high frequency field within a hollow conductor, comprising a direct current load device, a pair of crystal detectors connected in a series circuit with each other and the load device, each of said detectors having current rectifying properties and offering its lower resistance to current in one direction in said circuit, a conductive probing rod having one end connected to a point in said circuit between said pair of detectors and the other end adapted to be inserted in said field, means adapted to provide a high frequency current path from said conductor to a point between one of said detectors and the load device, each of said detectors having current rectifying properties and offering its lower resistance to current in one direction in said series circuit, and a capacitor connected in shunt across said load device for by-passing high frequency current about the load device.

5. Apparatus for use with a source of high frequency voltage comprising a load device, a resistor adapted to have a voltage from said source impressed thereacross and offering a high, substantially non-reactive impedance to high frequency current therethrough, a rectifier connected in a series circuit with said resistor and load device, and a capacitor for by-passing high frequency current about the load device connected in shunt with the load device.

6. In combination with a hollow electrical conducting chamber having an aperture in its walls, a conductive rod dimensioned to extend through said aperture into said hollow conductor, a first rectifier, means for serially connecting said rectifier and a load between the portion of said rod external to said chamber and the walls of said chamber, means for shunting a capacitance across said load, and means for connecting a second rectifier between said walls and said portion of said rod.

7. In combination with a hollow electrical conducting chamber having an aperture in its walls, a conductive rod dimensioned to extend through said aperture into said hollow conductor, a first rectifier, means for serially connecting said rectifier and a direct-current instrument between the portion of said rod external to said chamber and the walls of said chamber, means for shunting a capacitance across said instrument, and means for connecting a second rectifier between said walls and said portion of said rod.

JOHN W. COLTMAN.

REFERENCES CITED

The following references are of record in the file of this patent:

UNITED STATES PATENTS

| Number | Name | Date |
| --- | --- | --- |
| 756,718 | Shoemaker | Apr. 5, 1904 |
| 1,901,741 | Fetsch | Mar. 14, 1933 |
| 1,964,141 | Rhodes et al. | June 26, 1934 |
| 2,106,713 | Bowen | Feb. 1, 1938 |
| 2,191,271 | Carter | Feb. 20, 1940 |
| 2,365,207 | Moles | Dec. 19, 1944 |
| 2,399,674 | Harrison | May 7, 1946 |
| 2,407,075 | Gurewitsch | Sept. 3, 1946 |
| 2,419,292 | Shepard | Apr. 22, 1947 |